US009946013B2

(12) United States Patent
Yang et al.

(10) Patent No.: US 9,946,013 B2
(45) Date of Patent: Apr. 17, 2018

(54) INDICATOR LIGHTS (71) Applicants: Yi Yang, North Syracuse, NY (US); Joseph Edward Platt, Baldwinsville, NY (US); Andrew James Butler, Baldwinsville, NY (US)

(72) Inventors: Yi Yang, North Syracuse, NY (US); Joseph Edward Platt, Baldwinsville, NY (US); Andrew James Butler, Baldwinsville, NY (US)

(73) Assignee: Cooper Technologies Company, Houston, TX (US)

(*) Notice: Subject to any disclaimer, the term of this patent is extended or adjusted under 35 U.S.C. 154(b) by 787 days.

(21) Appl. No.: 14/490,140

(22) Filed: Sep. 18, 2014

(65) Prior Publication Data
US 2016/0085022 A1   Mar. 24, 2016

(51) Int. Cl.
G01D 11/28 (2006.01)
F21V 8/00 (2006.01)
F21V 23/00 (2015.01)
F21V 25/12 (2006.01)
F21V 5/04 (2006.01)
F21W 111/00 (2006.01)
(Continued)

(52) U.S. Cl.
CPC .......... G02B 6/0096 (2013.01); F21V 23/009 (2013.01); F21V 25/12 (2013.01); F21V 5/048 (2013.01); F21V 7/0091 (2013.01); F21W 2111/00 (2013.01); F21Y 2113/17 (2016.08); F21Y 2115/10 (2016.08)

(58) Field of Classification Search
CPC ..... G02B 6/0096; F21V 23/009; F21V 25/12; F21V 2113/17; F21V 2115/10; F21V 5/048; F21V 7/0091
USPC ........................................................ 362/23.08
See application file for complete search history.

(56) References Cited

U.S. PATENT DOCUMENTS 4,156,891 A * 5/1979 Roche ..................... F21S 9/022
307/66
5,567,036 A   10/1996 Theobald et al.
(Continued)

FOREIGN PATENT DOCUMENTS

EP   0344627   12/1989
EP   0438630   7/1991
(Continued)

OTHER PUBLICATIONS

E. Starostina, International Search Report and Written Opinion issued in International Application No. PCT/US2015/050752, completion date Dec. 11, 2015, dated Jan. 14, 2016, 7 pages, Federal Institute of Industrial Property, Moscow, Russia.
(Continued)

Primary Examiner — Bryon T Gyllstrom
(74) Attorney, Agent, or Firm — King & Spalding LLP (57) ABSTRACT An indicator light is disclosed herein. The indicator light can include a housing having at least one wall, where the at least one wall forms a cavity, and where the housing has a first length. The indicator light can also include a light guide disposed within the housing at a distal end of the housing, where the light guide has a second length that is less than the first length. The indicator light can further include a light source disposed adjacent to the light guide. The housing and the light guide can form a flame path therebetween.

20 Claims, 7 Drawing Sheets (51) Int. Cl.
  *F21V 7/00* (2006.01)
  *F21Y 115/10* (2016.01)
  *F21Y 113/17* (2016.01)

(56) References Cited

U.S. PATENT DOCUMENTS

| | | | |
|---|---|---|---|
| 5,585,783 | A | 12/1996 | Hall |
| 5,806,965 | A | 9/1998 | Deese |
| 5,821,695 | A | 10/1998 | Vilanilam et al. |
| 5,880,667 | A | 3/1999 | Altavela et al. |
| 6,135,612 | A | 10/2000 | Clore |
| 6,425,678 | B1 | 7/2002 | Verdes et al. |
| 6,483,254 | B2 | 11/2002 | Vo et al. |
| 6,491,417 | B1 | 12/2002 | Haen et al. |
| 6,525,668 | B1 | 2/2003 | Petrick |
| 6,547,417 | B2 | 4/2003 | Lee |
| 6,598,996 | B1 | 7/2003 | Lodhie |
| 6,948,830 | B1 | 9/2005 | Petrick |
| 7,104,677 | B2 | 9/2006 | Barlian et al. |
| 7,111,961 | B2 | 9/2006 | Trenchard et al. |
| 7,637,636 | B2 | 12/2009 | Zheng et al. |
| 7,641,361 | B2 | 1/2010 | Wedell et al. |
| 7,757,623 | B2 * | 7/2010 | Manahan .......... G08B 5/36 116/203 |
| 7,758,210 | B2 | 7/2010 | Peck |
| 7,832,908 | B2 | 11/2010 | Peck et al. |
| 7,839,281 | B2 * | 11/2010 | Manahan .......... G08B 5/36 340/287 |
| 7,975,527 | B2 | 7/2011 | Manahan |
| 8,228,206 | B2 | 7/2012 | Manahan |
| 8,362,513 | B2 | 1/2013 | Kim |
| 8,480,249 | B2 | 7/2013 | Curran et al. |
| 8,698,647 | B2 | 4/2014 | Huang |
| 8,905,581 | B1 * | 12/2014 | Pan .......... F21S 4/001 362/249.08 |
| 2002/0122309 | A1 | 9/2002 | Abdelhafez et al. |
| 2008/0074886 | A1 * | 3/2008 | Chang .......... F21V 7/0091 362/309 |
| 2008/0106903 | A1 * | 5/2008 | King .......... F21S 48/215 362/308 |
| 2009/0135607 | A1 * | 5/2009 | Holloway .......... F21V 25/12 362/362 |
| 2009/0303084 | A1 | 12/2009 | Tartock et al. |
| 2011/0121734 | A1 | 5/2011 | Pape |
| 2011/0182065 | A1 * | 7/2011 | Negley .......... F21V 5/04 362/231 |
| 2011/0232561 | A1 * | 9/2011 | Holloway .......... G08B 5/36 116/201 |
| 2012/0146813 | A1 | 6/2012 | Gilmore |
| 2012/0169204 | A1 * | 7/2012 | Wu .......... F21V 7/0066 313/116 |
| 2012/0182758 | A1 * | 7/2012 | Nath .......... A61N 5/0616 362/582 |
| 2013/0027917 | A1 | 1/2013 | Luo |
| 2013/0049980 | A1 | 2/2013 | Di Giovine |
| 2013/0141255 | A1 | 6/2013 | McDermott |
| 2013/0286658 | A1 | 10/2013 | Chen et al. |

FOREIGN PATENT DOCUMENTS

| | | |
|---|---|---|
| GB | 2082748 | 11/1982 |
| JP | H09229725 | 9/1997 |
| SU | 1352549 | 11/1987 |
| WO | 2006110273 | 10/2006 |

OTHER PUBLICATIONS

Machine translation of JPH09229725A, via LexsisNexsis Total Patent, 4 pages.
Machine translation of SU1352549, via LexsisNexsis Total Patent, 4 pages.

* cited by examiner

INDICATOR LIGHTS

TECHNICAL FIELD

Embodiments of the invention relate generally to light sources, and more particularly to systems, methods, and devices for indicator lights.

BACKGROUND

Indicator lights are used to show the status of a system or part of a system. Specifically, the color of an indicator light and/or mode of operation (e.g., flashing), when lit, can notify a user about the status of a system or part of a system. As an example, when an indicator light is red and is lit, a user can be notified that a motor is not running. As another example, when an indicator light is green and is lit, a user can be notified that a breaker within a switchgear cabinet is closed.

SUMMARY

In general, in one aspect, the disclosure relates to an indicator light. The indicator light can include a housing having at least one wall, where the at least one wall forms a cavity, and where the housing has a first length. The indicator light can also include a light guide disposed within the housing at a distal end of the housing, where the light guide has a second length that is less than the first length. The indicator light can further include a light source disposed adjacent to the light guide. The housing and the light guide can form a flame path therebetween.

In another aspect, the disclosure can generally relate to an indicator light assembly. The indicator light assembly can include a mounting frame and an indicator light coupled to the mounting frame. The indicator light can include housing having at least one wall, where the at least one wall forms a cavity, and where the housing has a first length. The indicator light can also include a light guide disposed within the housing at a distal end of the housing, where the light guide has a second length that is less than the first length. The indicator light can further include a light source disposed adjacent to the light guide. The housing and the light guide can form a flame path therebetween.

In yet another aspect, the disclosure can generally relate to an indicator light. The indicator light can include an outer housing having at least one outer housing wall, where the at least one outer housing wall forms a first cavity, and where the outer housing has a first length. The indicator light can also include an inner housing movably disposed within the first cavity of the outer housing, where the inner housing comprises at least one inner housing wall, where the at least one inner housing wall forms a second cavity. The indicator light can further include a light guide disposed within the second cavity of the inner housing at a distal end of the inner housing, where the light guide has a second length that is less than the first length, and where the light guide and the inner housing are movable between a first position and a second position within the outer housing. The indicator light can also include a light source disposed adjacent to the light guide. The indicator light can further include a switch disposed in the first cavity and adjacent to a proximal end of the inner housing, where the switch toggles between at first state and a second state. The inner housing and the outer housing can form a flame path therebetween.

In yet another aspect, the disclosure can generally relate to an indicator light assembly. The indicator light assembly can include a mounting frame and an indicator light coupled to the mounting frame. The indicator light can include a housing, a light guide disposed within the housing, and a light source disposed adjacent to the light guide. The indicator light assembly can also include a control module mechanically coupled to the mounting frame and operatively coupled to the light source of the indicator light. The control module can control an operation mode of the light source. The indicator light can be configured to be coupled to an electrical enclosure.

These and other aspects, objects, features, and embodiments will be apparent from the following description and the appended claims.

BRIEF DESCRIPTION OF THE DRAWINGS

The drawings illustrate only example embodiments of indicator lights and are therefore not to be considered limiting of its scope, as indicator lights may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, apparatuses, and methods of indicator lights. While the example indicator lights shown in the Figures and described herein are directed to electrical enclosures, example indicator lights can also be used with other devices aside from electrical enclosures, including but not limited to instrumentation devices, electronics devices, control boards, and light fixtures. Thus, the examples of indicator lights described herein are not limited to use with electrical enclosures.

Further, while example embodiments described herein are directed toward a light source that includes one or more light-emitting diodes (LEDs), light sources of example indicator lights are not limited to LEDs. Examples of other light sources that can be used with example indicator lights can include, but are not limited to, incandescent, halogen, fluorescent, and sodium vapor.

Any example indicator light, or portions (e.g., features) thereof, described herein can be made from a single piece (as from a mold). When an example indicator light or portion thereof is made from a single piece, the single piece can be cut out, bent, stamped, and/or otherwise shaped to create certain features, elements, or other portions of a component. Alternatively, an example indicator light (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, and/or perform other functions aside from merely coupling. In addition, each component and/or feature described herein (including each component of an example indicator light) can be made of one or more of a number of suitable materials, including but not limited to metal, ceramic, rubber, and plastic.

A coupling feature (including a complementary coupling feature) as described herein can allow one or more components and/or portions of an indicator light (e.g., a housing) to become mechanically and/or electrically coupled, directly or indirectly, to another portion (e.g., guard) of the indicator light and/or to an electrical enclosure. A coupling feature can include, but is not limited to, a portion of a hinge, an aperture, a recessed area, a protrusion, a slot, a spring clip, a tab, a detent, and mating threads. One portion of an example indicator light can be coupled to another portion of an indicator light and/or to an electrical enclosure by the direct use of one or more coupling features.

In addition, or in the alternative, a portion of an example indicator light can be coupled to another portion of the indicator light and/or an electrical enclosure using one or more independent devices that interact with one or more coupling features disposed on a component of the indicator light. Examples of such devices can include, but are not limited to, a pin, a hinge, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

As described herein, a user can be any person that interacts with example indicator lights or systems that use indicator lights. Examples of a user may include, but are not limited to, an engineer, an electrician, a maintenance technician, an instrumentation and controls technician, a mechanic, an operator, a consultant, a contractor, a homeowner, and a manufacturer's representative.

The indicator light described herein can be placed in outdoor environments. In addition, or in the alternative, example indicator lights can be subject to extreme heat, extreme cold, moisture, humidity, high winds, dust, chemical corrosion, and other conditions that can cause wear on the indicator light or portions thereof. In certain example embodiments, the indicator light, including any portions thereof, are made of materials that are designed to maintain a long-term useful life and to perform when required without mechanical failure.

In addition, or in the alternative, example indicator lights can be located in hazardous and/or explosion-proof environments. In the latter case, the electrical enclosure in which example indicator lights can be disposed can be an explosion-proof enclosure (also known as a flame-proof enclosure). An explosion-proof enclosure is an enclosure that is configured to contain an explosion that originates inside, or can propagate through, the enclosure. Further, the explosion-proof enclosure is configured to allow gases from inside the enclosure to escape across joints of the enclosure and cool as the gases exit the explosion-proof enclosure. The joints are also known as flame paths and exist where two surfaces (for example, the housing of an indicator light and an enclosure cover, or the housing of an indicator light and a light guide of the indicator light) meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

In one or more example embodiments, an explosion-proof enclosure is subject to meeting certain standards and/or requirements. For example, the National Electrical Manufacturers Association (NEMA) sets standards with which an enclosure must comply in order to qualify as an explosion-proof enclosure. Specifically, NEMA Type 7, Type 8, Type 9, and Type 10 enclosures set standards with which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and Underwriters' Laboratories, Inc. (UL) (e.g., UL 1203). For example, a Class 1 hazardous area under the National Electric Code is an area in which flammable gases or vapors may be present in the air in sufficient quantities to be explosive.

Examples of a hazardous location in which example embodiments can be used can include, but are not limited to, an airplane hanger, an airplane, a drilling rig (as for oil, gas, or water), a production rig (as for oil or gas), a refinery, a chemical plant, a power plant, a mining operation, and a steel mill.

Example embodiments of indicator lights will be described more fully hereinafter with reference to the accompanying drawings, in which example embodiments of indicator lights are shown. Indicator lights may, however, be embodied in many different forms and should not be construed as limited to the example embodiments set forth herein. Rather, these example embodiments are provided so that this disclosure will be thorough and complete, and will fully convey the scope of indicator lights to those of ordinary skill in the art. Like, but not necessarily the same, elements (also sometimes called modules) in the various figures are denoted by like reference numerals for consistency.

Terms such as "first," "second," "end," "inner," "outer," "upper," "lower," "top," "bottom," "distal," and "proximal" are used merely to distinguish one component (or part of a component or state of a component) from another. Such terms are not meant to denote a preference or a particular orientation. Also, the names given to various components described herein are descriptive of example embodiments and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

Figure 1A:
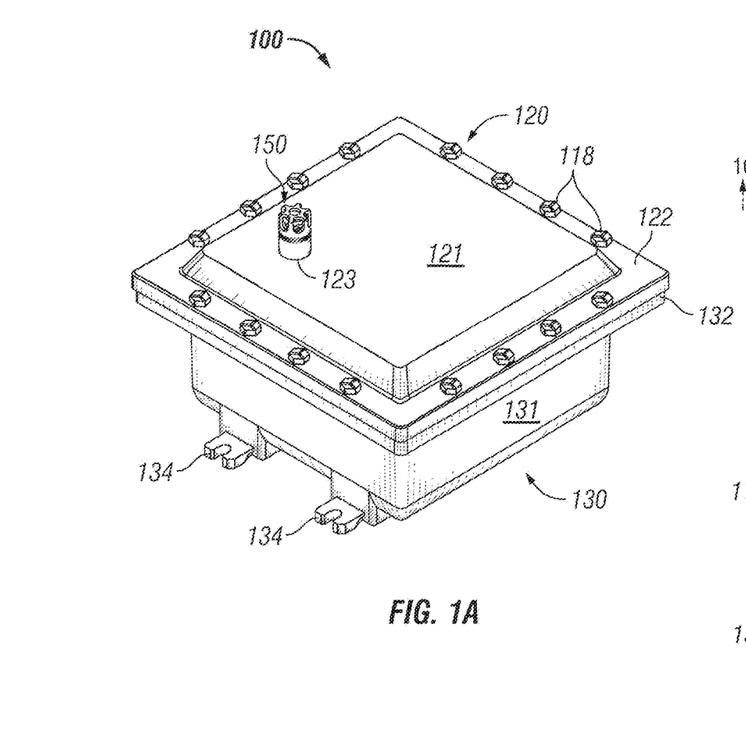
FIGS. 1A-1C show an electrical enclosure that includes an indicator light in accordance with certain example embodiments.
Figure 1B:
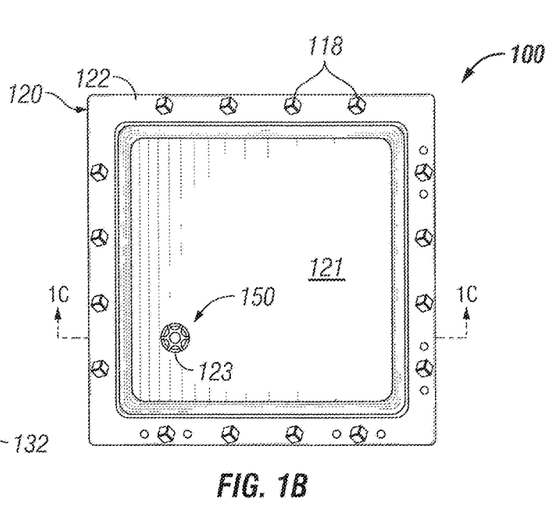
Figure 1C:
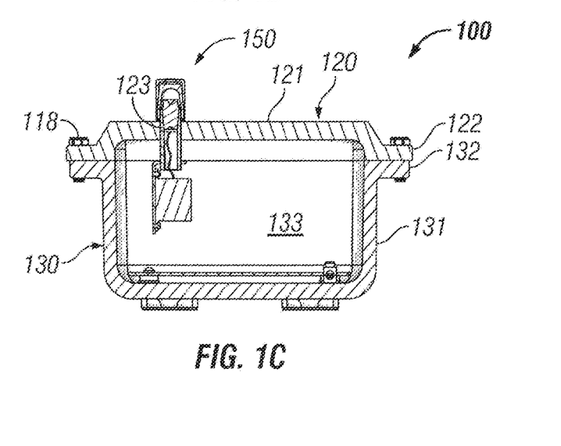

FIGS. 1A-1C show various views of an electrical enclosure 100 in which an example indicator light assembly 150 is disposed in accordance with certain example embodiments. Specifically, FIG. 1A shows a top perspective view of the electrical enclosure 100. FIG. 1B shows a top view of the electrical enclosure 100. FIG. 1C shows a cross-sectional side view of the electrical enclosure 100. In one or more embodiments, one or more of the components shown in FIGS. 1A-1C may be omitted, added, repeated, and/or substituted. Accordingly, embodiments of electrical enclosures having indicator lights should not be considered limited to the specific arrangements of components shown in FIGS. 1A-1C.

Referring to FIGS. 1A-1C, the electrical enclosure 100 can have an enclosure cover 120 and an enclosure body 130. The electrical enclosure 100 can have a closed position (when the enclosure cover 120 is coupled to the enclosure body 130) and an open position (when the enclosure cover 120 is decoupled from the enclosure body 130). In this case, the electrical enclosure 100 is shown in the closed position. The enclosure cover 120 can be removeably attached to the enclosure body 130, providing access to any devices (e.g., electrical cable, variable frequency drive (VFD), air moving device, programmable logic controller, terminal block, switch, example indicator light) located within the cavity 133 formed by one or more walls 131 of the enclosure body 130.

The enclosure cover 120 can be secured to the enclosure body 130 in one or more of a number of ways. For example, as shown in FIGS. 1A-1C, the enclosure cover 120 can be coupled to the enclosure body 130 using a number of fastening devices 118 (e.g., bolts, clamps) located at a number of points around the outer perimeter of the wall 121 of the enclosure cover 120 and the enclosure body 130. Specifically, the fastening devices 118 can be disposed in a number of apertures (hidden from view) that traverse a cover flange 122 in the enclosure cover 120 and a body flange 132 in the enclosure body 130. In such a case, the apertures in the cover flange 122 and the apertures in the body flange 132 can be aligned with each other when the enclosure cover 120 is mated with the enclosure body 130. Further, the apertures in the cover flange 122 and the apertures in the body flange 132 can have any shape, size, and features (e.g., mating threads) for coupling with the fastening devices 118.

Optionally, one or more hinges (not shown) can be secured to one side of the enclosure cover 120 and a corresponding side of the enclosure body 130 so that, when all of the fastening devices 118 are removed, the enclosure cover 120 may swing outward (i.e., an open position) from the enclosure body 130 using the one or more hinges. In one or more exemplary embodiments, there are no hinges, and the enclosure cover 120 can be separated from the enclosure body 130 when all of the fastening devices 118 are removed or otherwise decoupled from the enclosure cover 120 and/or the enclosure body 130.

The enclosure cover 120 and the enclosure body 130 may be made from one or more of a number of suitable materials, including but not limited to metal (e.g., alloy, stainless steel), plastic, some other material, or any combination thereof. The enclosure cover 120 and the enclosure body 130 may be made of the same material or different materials. In some cases, on the end of the enclosure body 130 opposite the body flange 132, one or more mounting brackets 134 are affixed to the exterior of the enclosure body 130 to facilitate mounting the enclosure body 130. Using the mounting brackets 134, the enclosure body 130 may be mounted to one or more of a number of surfaces and/or elements, including but not limited to a wall, a control cabinet, a cement block, an I-beam, and a U-bracket.

The enclosure cover 120 may include one or more features that allow for user interaction while the electrical enclosure 100 is sealed in the closed position. For example, as shown in FIGS. 1A-1C, one or more indicator lights (e.g., indicator light assembly 150) may be disposed in an aperture 123 (hidden from view in FIGS. 1A-1C by the indicator light assembly 150) of the electrical enclosure 100 (e.g., on the enclosure cover 120). The indicator light assembly 150 may be used to indicate a status of a feature or process associated with equipment located inside the electrical enclosure 100. For example, the indicator light assembly 150 may show a constant green light if a motor controlled by a VFD located inside the electrical enclosure 100 is operating. As another example, the indicator light assembly 150 may flash red when a motor controlled by a VFD located inside the electrical enclosure 100 has a problem (e.g., tripped circuit, VFD overheats, overcurrent situation). As another example, the indicator light assembly 150 may show a constant red light when an electromagnetic pulse caused by an explosion inside the electrical enclosure 100 has resulted. More details about the example indicator light assembly 150 are provided below with respect to FIGS. 2A-2C.

Figure 2A:
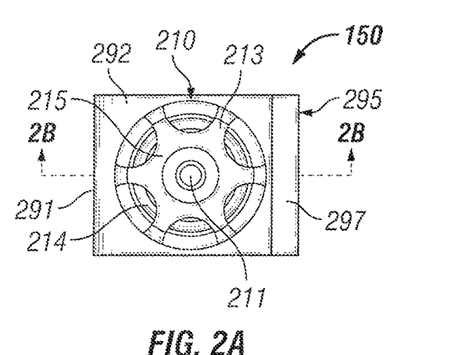
FIGS. 2A-2C show an indicator light assembly in accordance with certain example embodiments.
Figure 2B:
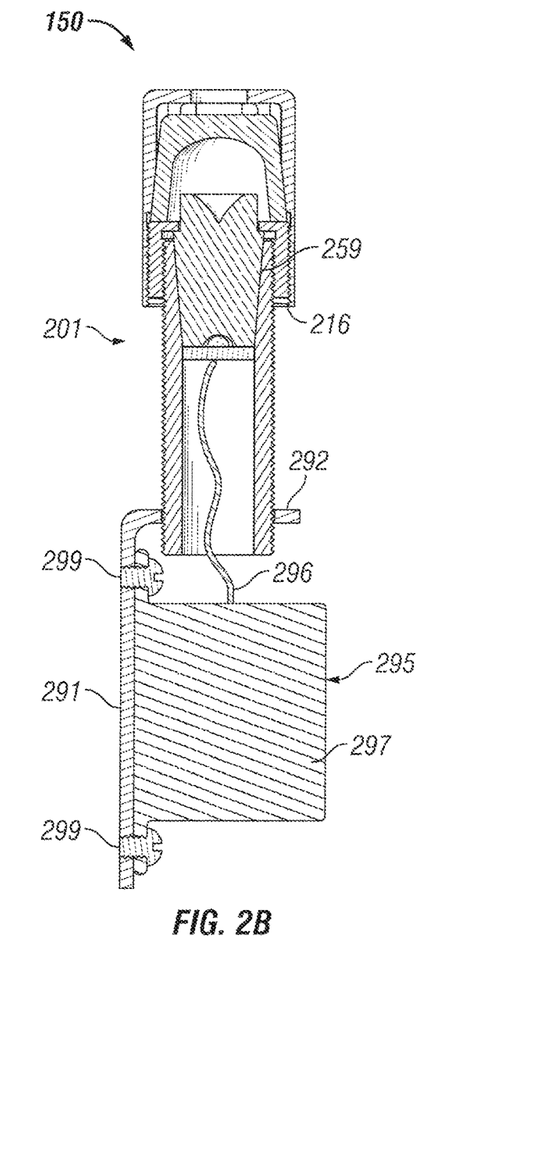
Figure 2C:
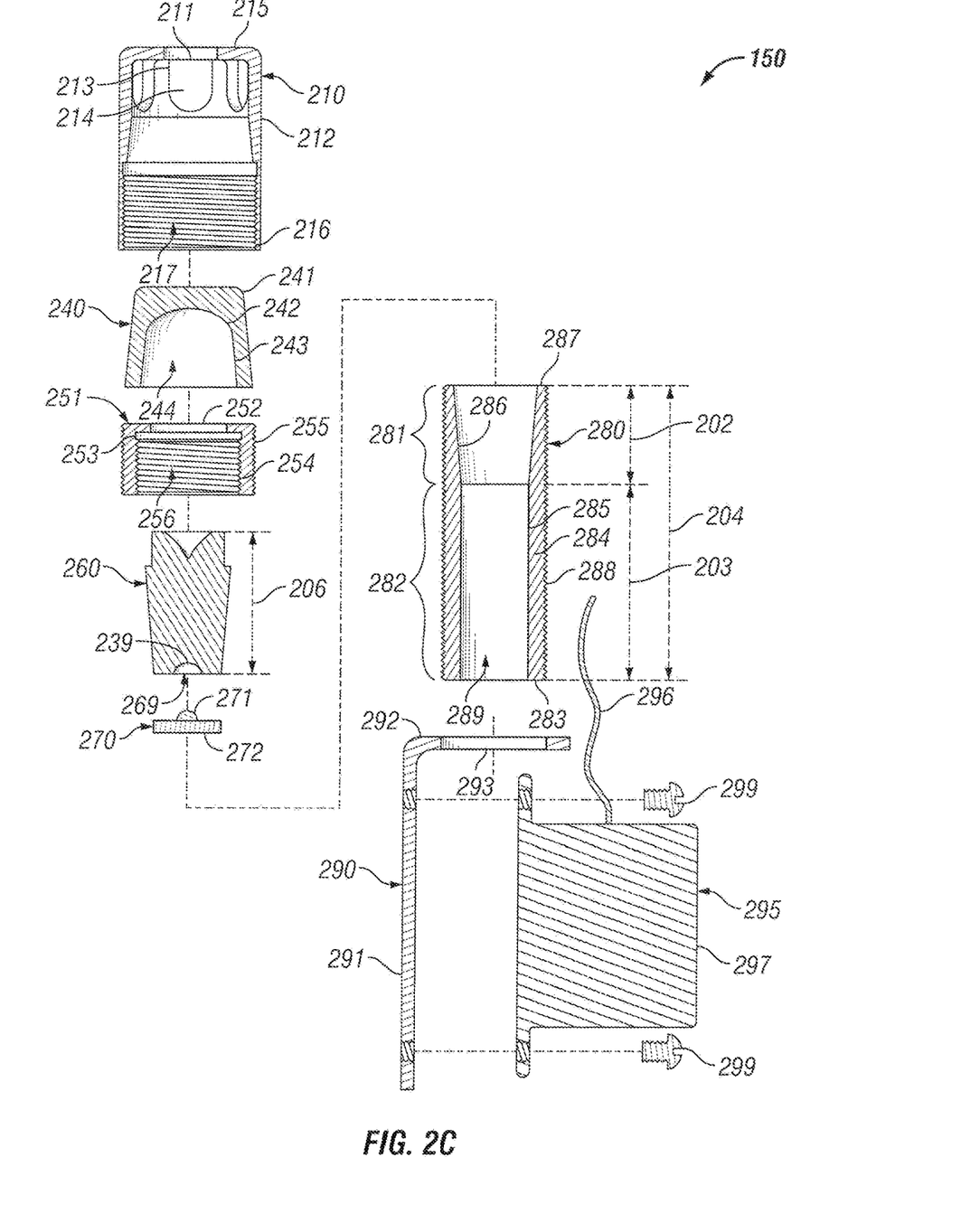

FIGS. 2A-2C show various views of an indicator light assembly 150 in accordance with certain example embodiments. Specifically, FIG. 2A shows a top view of the indicator light assembly 150. FIG. 2B shows a cross-sectional side view of the indicator light assembly 150. FIG. 2C shows an exploded cross-sectional side view of the indicator light assembly 150. In one or more embodiments, one or more of the components shown in FIGS. 2A-2C may be omitted, added, repeated, and/or substituted. Accordingly, embodiments of indicator lights should not be considered limited to the specific arrangements of components shown in FIGS. 2A-2C.

Referring to FIGS. 1A-2C, the indicator light assembly 150 of FIGS. 2A-2C can include an indicator light 201, a mounting frame 290, and a control module 295. The indicator light 201 can include a housing 280, a light guide 260, a light engine assembly 270, a guard 210, an optional lens 240, and an optional adapter 251. The housing 280 can include one or more walls 284 that form a cavity 289. The housing 280 can have a length 204 (also called a height). In certain example embodiments, the housing 280 can have multiple portions. For example, as shown in FIGS. 2A-2C, the housing 280 has an upper portion 281 and a lower portion 282. In this case, the upper portion 281 has a length 202, and the lower portion 282 has a length 203.

One or more portions of the housing 280 of the indicator light 201 can have a wall 284 with a substantially uniform thickness. For example, as shown in FIGS. 2A-2C, the wall 284 of the lower portion 282 has a substantially uniform thickness along its length 203. Alternatively, one or more other portions of the housing 280 can have a wall 284 with varying thicknesses. For example, as shown in FIGS. 2A-2C, the wall 284 of the upper portion 281 decreases along the length 202 of the upper portion 281, from the lower end of the upper portion 281 to the upper end of the upper portion 281 (and thus the upper end 287 of the housing 280). If a portion of the housing 280 has a wall 284 with varying thicknesses, the thicknesses can vary in one or more of a number of ways. For example, variations in the thickness of a wall 284 of the housing 280 can be constant, random, or stepped.

The wall 284 can have an inner surface (e.g., inner surface 285, inner surface 286) and an outer surface 288. The inner surface and the outer surface 288 of the housing 280 (or a portion of the housing 280) can have one or more of a number of features along some or all of its length. Examples of such features can include, but are not limited to, coupling features (e.g., threading, notches, slots, detents, grooves, undercuts), a smooth surface, a textured surface, and a sawtooth surface. In this example, the outer surface 288 is threaded (has coupling features disposed thereon), while the inner surface 286 of the upper portion 281 and the inner surface 285 of the lower portion 282 are smooth.

In certain example embodiments, the light engine assembly 270 of the indicator light 201 includes a circuit board 272 and at least one light source 271. The circuit board 272 can be a medium that includes, and on which are disposed, one or more of a number of discrete components (e.g., a capacitor, a power terminal, a resistor, a light source 271) and/or one or more integrated circuits that are interconnected with each other by a number of wire traces embedded in the circuit board 272. The circuit board 272 can be called one or more of a number of other names, including but not limited to a board, a wiring board, a circuit board, printed wiring board, and a printed circuit board.

As discussed above, a light source 271 can use any of a number of different types of lighting technologies, including but not limited to LED, incandescent, halogen, fluorescent, and sodium vapor. If the light source 271 uses LED technology, the light source can be any type of LED, including but not limited to chip-on-board, discrete, and array. Further, a light source 271 can emit one or more of a number of colors (e.g., white, red, green, blue) in one or more of a number of modes (e.g., constant, flashing, intermittent, color transitions). For example, the light source 271 can be a tricolor LED that is capable of emitting red light, green light, blue light, and/or light with any combination thereof. As discussed below, a control module 295 can be operatively coupled to the light source 271 and control the operation mode of the light source 271.

In certain example embodiments, the light engine assembly 270 can be located at one end (e.g., the proximal end) of the light guide 260. The light engine assembly 270 can be positioned adjacent to the light guide 260. For example, some or all of the light engine assembly 270 can be disposed within a cavity 269 formed within the light guide 260. For example, as shown in FIGS. 2B and 2C, the light source 271 can be disposed on and extend away from a top surface of the circuit board 272. In such a case, the top surface of the circuit board 272 can abut against an end of the light guide 260, and the light source 271 can disposed within a cavity 269 formed by a surface 239 of the light guide 260. The cavity 269 can be substantially the same shape and size as the portion of the light source 271 that extends into the cavity 269. Alternatively, the cavity 269 can have a different shape and/or size compared to the portion of the light source 271 that extends into the cavity 269. As another example, no portion of the light engine assembly 270 is disposed within the cavity 269, or there is no cavity 269. In any of these cases, the light engine assembly 270 is considered to be positioned adjacent to the light guide 260.

Figure 6A:
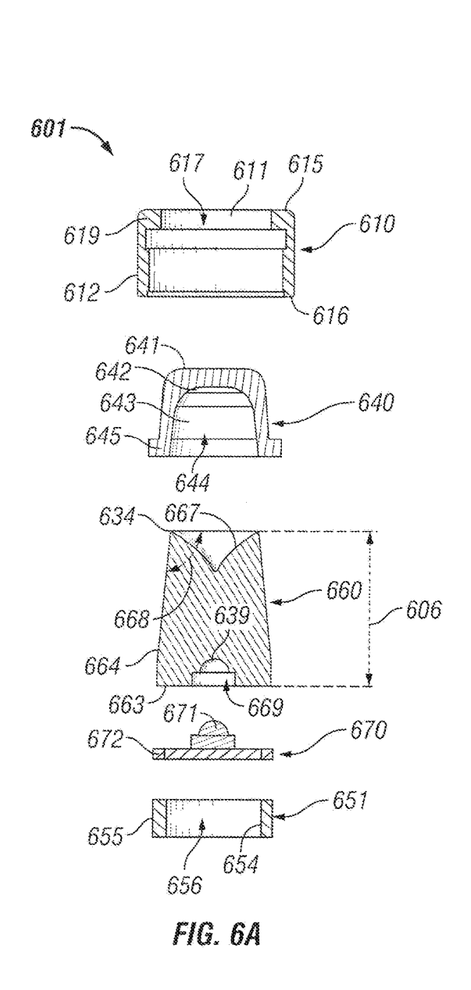
FIGS. 6A and 6B show another indicator light in accordance with certain example embodiments.
Figure 6B:
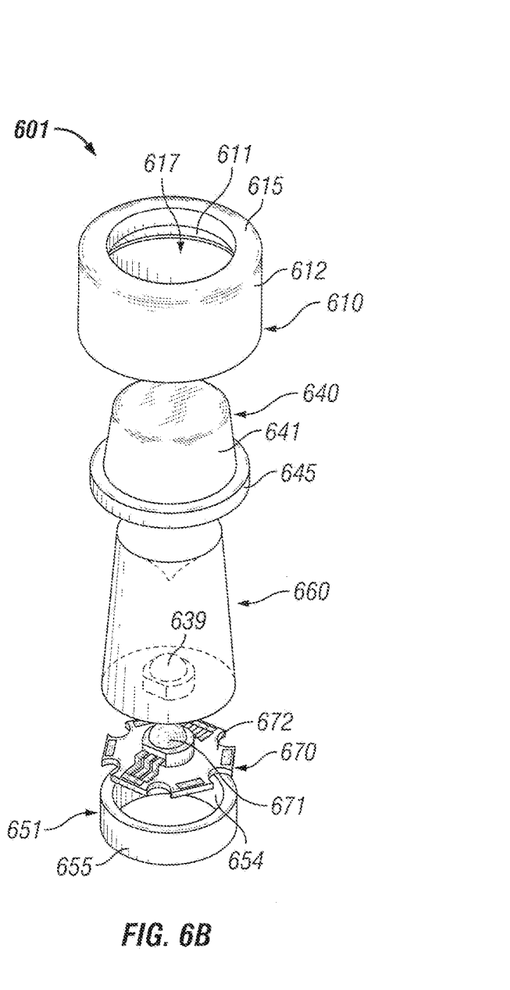

In certain example embodiments, the light guide 260 of the indicator light 201 is disposed within the cavity 289 of the housing 280. More specifically, the light guide 260 can be disposed within a portion of the housing 280. In this example, the light guide 260 is disposed within the upper portion 281 of the housing 280. The light guide 260 can have a length 206 that is less than the length 204 of the housing. The light guide 260 can be tapered in such a way (e.g., outward, as shown in FIGS. 2B and 2C, inward, as shown in FIGS. 6A and 6B) as to rest substantially flush against the inner surface 286 of the upper portion 281 of the housing 280. In certain example embodiments, the housing 280 and the light guide 260 form a flame path 259 therebetween. In such a case, the inner surface 286 of the housing 280 and the outer surface of the light guide 260 can have one or more features (e.g., mating threads, grooves, detents) to both help the housing 280 and the light guide 260 couple to each other and to create a flame path 259 that is properly engineered to comply with any applicable standards and/or regulations. Alternatively, the inner surface 286 of the housing 280 and the outer surface of the light guide 260 can be smooth to create a flame path 259 therebetween.

The light guide 260 is an optical device that manipulates light emitted by the light source 271 and sends the manipulated light away from the indicator light 201. The light guide 260 (or portions thereof) can be made from one or more of a number of materials, including but not limited to plastic, polycarbonate (e.g., clear, diffused), and glass. The light guide 260 can be made with one or more diffused materials for desired color mixing of the light emitted by the light sources 271. More details of the light guide 260 are provided below with respect to FIG. 4.

Figure 7:
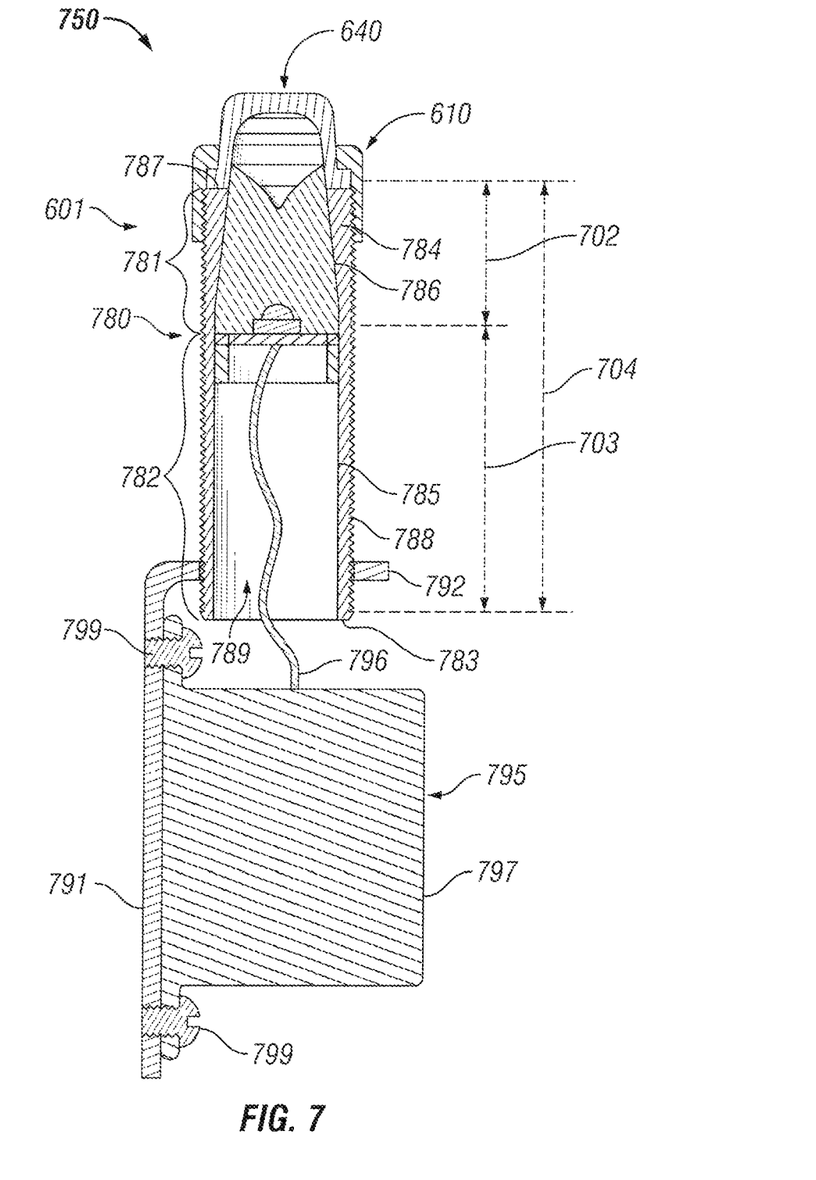
FIG. 7 shows another indicator light assembly in accordance with certain example embodiments.

In certain example embodiments, the optional adapter 251 is used to stabilize and/or position one or more components (or portions thereof) of the indicator light assembly 150. For example, as shown in FIGS. 2B and 2C, the adapter 251 can be disposed adjacent to the housing 280, the light guide 260, and the guard 210. For example, as shown in FIGS. 2B and 2C, the adapter 251 can be disposed on (e.g., coupled to) the outer surface of some of the upper portion 281 of the housing 280, on the outer surface of some of the upper portion 461 (see FIG. 4 below) of the light guide 260, and within a portion of the cavity 217 formed by the outer wall 212 of the guard 210. In certain example embodiments, the adapter 251 can be disposed at other locations relative to the housing 280 and/or the indicator light 201. For example, as shown in FIGS. 6A-7 below, the adapter can be disposed toward the middle of the housing and at the bottom of the indicator light.

The optional adapter 251 can include a number of features and/or portions to enable the adapter 251 to provide mechanical stability between the housing 280, the light guide 260, and the guard 210. For example, as shown in FIGS. 2B and 2C, the adapter 251 can have an outer surface 255 that has substantially the same shape and features as the inner surface of the outer wall 212 of the guard 210, against which the outer surface 255 of the adapter 251 is disposed. As another example, the adapter 251 can include multiple inner surfaces that vary the width of the cavity 256, which can traverse the length of the adapter 251. In this case, inner surface 254 has the largest outer perimeter (e.g., diameter) and is located along most of the length of the adapter 251, starting from the bottom. The shape and size of the inner surface 254 can be such that the top end of the upper portion 281 of the housing 280 can be disposed within the portion of the cavity 256 formed by the inner surface 254.

In certain example embodiments, as shown in FIGS. 2B and 2C, the inner surface 254 of the adapter 251 can have one or more of a number of coupling features (e.g., mating threads (as shown), clips, tabs, detents) that complement the coupling features of the outer surface 288 of the upper portion 281 of the housing 280. In addition, or in the alternative, as shown in FIGS. 2B and 2C, the outer surface 255 of the adapter 251 can have one or more of a number of coupling features (e.g., mating threads (as shown), clips, tabs, detents) that complement the coupling features of the inner surface of the outer wall 212 of the guard 210.

Inner surface 252 has the smallest outer perimeter (e.g., diameter) and is located along a small portion of the length of the adapter 251, starting from the top. The shape and size of the inner surface 252 can be such that the bottom end of the upper portion 461 of the light guide 260 can be disposed within the portion of the cavity 256 formed by the inner surface 252. Inner surface 253 has an outer perimeter that is larger than that of inner surface 252 and smaller than that of inner surface 254, and is disposed between inner surface 252 and inner surface 254. The length of inner surface 253 is slightly less than the length of inner surface 252. The shape and size of the inner surface 253 can be such that the top end of the lower portion 462 (described below with respect to FIG. 4) of the light guide 260 can be disposed within the portion of the cavity 256 formed by the inner surface 253.

The optional lens 240 can be disposed adjacent to the adapter 251 and within the guard 210. For example, as shown in FIGS. 2B and 2C, the lens 240 can be disposed on (e.g., coupled to) the top of the adapter 251, on the outer surface of some of the upper portion 461 of the light guide 260, and within a portion of the cavity 217 formed by the outer wall 212 of the guard 210.

The lens 240 can include a number of features and/or portions to enable the lens 240 to provide a desired optical effect as well as mechanical stability between the adapter 251, the light guide 260, and the guard 210. For example, as shown in FIGS. 2B and 2C, the lens 240 can have an outer surface 241 that has substantially the same shape and features as the inner surface of the outer wall 212 of the guard 210, against which the outer surface 241 of the lens 240 is disposed. As another example, the lens 240 can include multiple inner surfaces that vary the width of the cavity 244. In this case, inner surface 243 has a tapered outer perimeter (e.g., diameter) and is located along most of the length of the lens 240, starting from the bottom. In this case, the tapered inner surface 243 has a decreasing outer perimeter further up along the length of the lens 240 and is used to help create a desired optical output (e.g., color, pattern, flashing) of the light emitted by the light source 271.

For indicator lights currently known in the art, the light source is located within the cavity 244 formed by the lens 240. As a result, the light source is more exposed to forces that can be applied to the guard 210, and so are more vulnerable to physical damage. For example, one or more certification standards can require that a portion of an indicator light exposed from an electrical enclosure must be able to withstand an impact test of at least 7 Joules. Consequently, the lens 240 used in indicator lights currently known in the art are constructed of more durable, less breakable material. This can increase the cost of the lens 240 for indicator lights. Thus, example embodiments, which have the light source 271 disposed at the bottom of the light guide 260 and away from damaging forces applied to the guard 210, can have a lens 240 made of less sturdy (and so less expensive) material. Further, the lens 240 in example embodiments can be more tailored for optical performance instead of protection.

The shape and size of the inner surface 243 can be such that the top end of the upper portion 461 of the light guide 260 can be disposed within the portion of the cavity 244 formed by the inner surface 243. The cavity 244 in this case does not traverse the length of the lens 240. Inner surface 242 has a curvature that caps the cavity 244 before reaching the top of the lens 240. The shape and size of the curvature of the inner surface 242 can be designed in such a way as to help create a desired optical output of the light emitted by the light source 271. The lens 240 can be made of one or more of a number of suitable materials, including but not limited to glass and plastic.

In certain example embodiments, the guard 210 is disposed over the optional lens 240, the adapter 251, and a portion of the housing 280. The guard 210 can be mechanically and movably (e.g., rotatably) coupled to another component of the indicator light 201. For example, as shown in FIG. 2B, the guard 210 can be mechanically coupled to the housing 280. Specifically, the lower end 216 of the outer wall 212 of the guard 210 can have one or more of a number of coupling features (e.g., mating threads, as in this case) disposed along its inner surface that movably couple to complementary coupling features (e.g., complementary mating threads) disposed on the outer surface 288 of the housing 280.

The guard 210 can be used to protect one or more other components (e.g., the lens 240, the light guide 260) of the indicator light 201. As such, the guard 210 can be made of one or more of a number of materials that can withstand minimum forces applied to the guard 210 without impacting the other components of the indicator light 201. Examples of such materials can include, but are not limited to metal (e.g., steel, aluminum), plastic, composite materials, and ceramic.

In addition, the guard 210 can have one or more features that allow light generated by the light source 271 to be emitted away from the indicator light 201. For example, as shown in FIGS. 2A-2C, the guard 210 can include a number of windows 214 disposed along its top end. Specifically, the guard can have a number of side windows 214 that are formed by the top wall 215 of the guard 210, the outer wall 212 of the guard 210, and a number of transition walls 213 disposed between the top wall 215 and the outer wall 212. In addition, a top window 211 is formed by the top wall 215 of the guard 210. In some cases, multiple top windows 211 can be disposed in the top wall 215. The shape and size of the top window 211 and each of the side windows 214 can be the same as, or different from, each other.

In certain example embodiments, the control module 295 sends power and control signals to, and in some cases receives control signals from, one or more light engine assemblies 270. The control module 295 can include hardware, software, and/or firmware. Settings, algorithms, and other aspects of the control module 295 can be set by a user, by default, based on field experience, and/or based on some other factor. The power and/or control signals generated by the control module 295 can control the light output (e.g., brightness, color, duration, pattern) of one or more light sources 271. The control module 295 can be operatively coupled to the one or more light engine assemblies 270 using wired and/or wireless technology. For example, as shown in FIGS. 2B and 2C, the control module 295 can be coupled to a light engine assembly 270 (or portion thereof, such as a light source 271 or circuit board 272) using an electrical conductor 296.

Alternatively, the control module 295 can include a hardware processor (not shown), which can execute software in accordance with one or more example embodiments. Specifically, the hardware processor can execute software, directly or indirectly, on the control module 295. The hardware processor can be an integrated circuit, a central processing unit, a multi-core processing chip, a multi-chip module including multiple multi-core processing chips, or other hardware processor in one or more example embodiments. The hardware processor is known by other names, including but not limited to a computer processor, a microprocessor, and a multi-core processor. In one or more example embodiments, the hardware processor executes software instructions stored in memory (not shown). The memory includes one or more cache memories, main memory, and/or any other suitable type of memory. The memory can be discretely located on the control module 295 relative to the hardware processor according to some example embodiments. In certain configurations, the memory also is integrated with the hardware processor.

In certain example embodiments, the control module 295 does not include a hardware processor. In such a case, the control module 295 can include, as an example, one or more field programmable gate arrays (FPGA) (not shown). Using FPGAs and/or other similar devices known in the art allows the control module 295 to be programmable and function according to certain logic rules and thresholds without the use of a hardware processor.

In certain example embodiments, the control module 295 includes a housing 297 inside of which its various components (e.g., hardware processor, memory, FPGAs, terminal blocks) are disposed. The housing 297 may include one or more of a number of coupling features (e.g., apertures) that are used, directly or indirectly, to couple the control module 295 to a mounting frame 290. For example, as shown in FIGS. 2B and 2C, fastening devices 299 (e.g., screws) traverse apertures (hidden from view) in the housing 297 of the control module 295 to mechanically couple the control module 295 to a lower end 291 of the mounting frame 290.

The mounting frame 290 can also be used to hold the indicator light 201. For example, as shown in FIGS. 2B and 2C, the housing 280 of the indicator light 201 can be disposed within an aperture 293 in a top end 292 of the mounting frame 290. In such a case, a wall of an enclosure (e.g., wall 121 of enclosure cover 120, shown in FIGS. 1A-1C, a wall 131 of an enclosure body 130) can have an aperture through which a portion of the housing 280 of the indicator light 201 can be disposed. For example, as shown in FIGS. 1A-1C, the top end 292 of the mounting frame 290 can abut against an inner surface of the wall 121 of the enclosure cover 120, and the lower end 216 of the outer wall 212 of the guard 210 can abut against the outer surface of the wall 121 of the enclosure cover 120.

The mounting frame 290 can also include one or more other coupling features that allow the mounting frame 290 to couple to one or more components of an electrical system. For example, the mounting frame 290 can include one or more additional apertures that allow the mounting frame, directly or indirectly, to couple to an interior surface of an electrical enclosure.

Figure 3A:
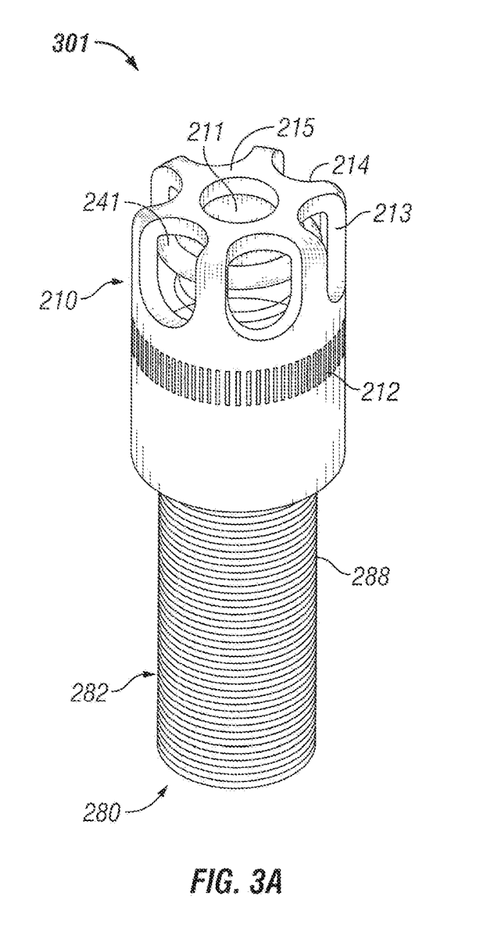
FIGS. 3A and 3B show an indicator light in accordance with certain example embodiments.
Figure 3B:
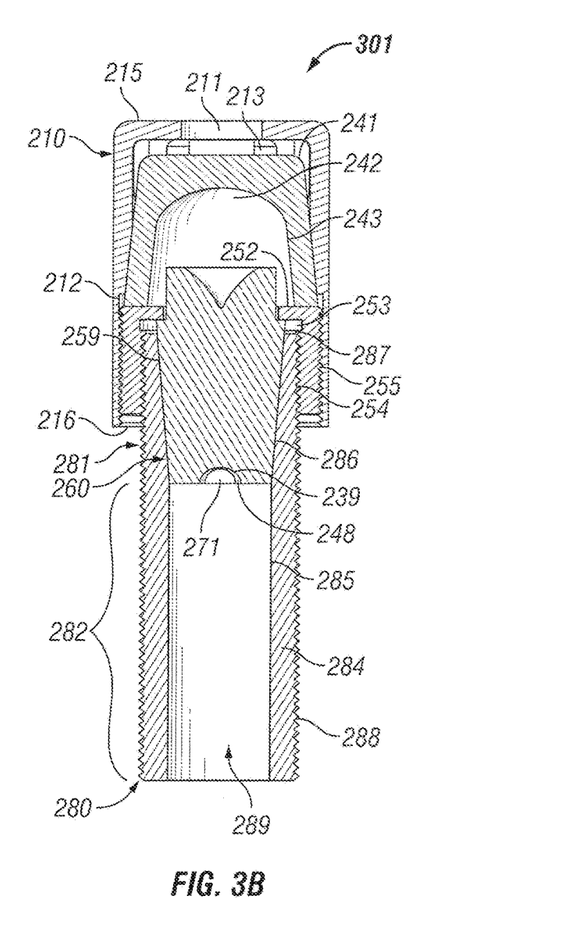

FIGS. 3A and 3B show portions of the indicator light 301 of FIGS. 2A-2C in accordance with certain example embodiments. Specifically, FIG. 3A shows a top-side perspective view of the indicator light 301, and FIG. 3B shows a cross sectional side view of the indicator light 301. The indicator light 301 of FIGS. 3A and 3B is identical to the indicator light 201 of FIGS. 2A-2C, except for that the indicator light 301 does not include the lighting assembly. Further, the mounting frame 290 and the control module 295 of FIGS. 2A-2C are not shown in FIGS. 3A and 3B. In addition, FIGS. 3A and 3B do not have an enclosure, as in FIGS. 1A-1C. Elements shown in FIGS. 3A and 3B but not described here can have the same description for the same element (having the same element number) in FIGS. 2A-2C above.

As shown in FIG. 3B, a flame path 259 is formed between the outer sides 464 of the lower portion 462 of the light guide 260 and the inner surface 286 of the upper portion 281 of the housing 280. The length of the flame path 259 can be any suitable length (e.g., at least one inch) for meeting applicable standards for explosion-proof and/or flame-proof enclosures. In the current art, indicator lights that are subject to applicable standards for explosion-proof and/or flame-proof enclosures use potting compound to create a flame barrier within the indicator light housing rather than creating a flame path within the indicator light housing. Specifically, in the current art, indicator lights that are subject to standards for explosion-proof and/or flame-proof enclosures put potting compound within the cavity 289 of the housing 280. (Indicator lights in the current art do not have an upper portion 281 and a lower portion 282 of the housing 280.)

Thus, by creating a flame path 259 between the outer sides 464 of the lower portion 462 of the light guide 260 and the inner surface 286 of the upper portion 281 of the housing 280, potting compound is not used, and so the cavity 289 of the housing 280 is void of potting compound. As a result, the electrical conductor(s) 296 that couple the light engine assembly 270 with the control module 295 can be accessed, repaired, replaced, or otherwise serviced, which the potting compound used in indicator light housings in the current art make impossible or impracticable.

Figure 4:
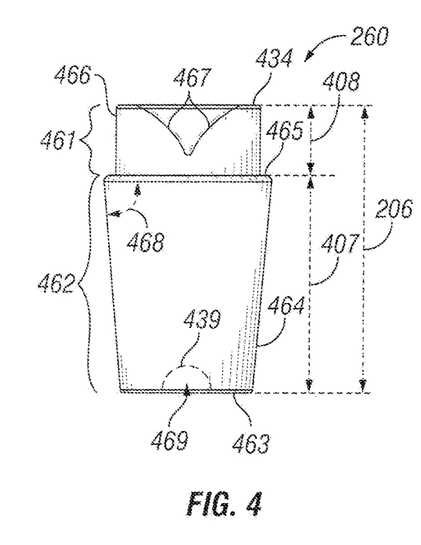
FIG. 4 shows a light guide in accordance with certain example embodiments.

FIG. 4 shows the light guide 260 of FIGS. 2A-3B in accordance with certain example embodiments. In one or more embodiments, one or more of the components shown in FIG. 4 may be omitted, added, repeated, and/or substituted. Accordingly, embodiments of light guides should not be considered limited to the specific arrangements of components shown in FIG. 4.

Referring to FIGS. 1A-4, the light guide 260 can have one or more of a number of configurations. For example, as shown in FIG. 4, the light guide 260 can have an optional upper portion 461 and a lower portion 462. In this case, the upper portion 461 has a length 408, and the lower portion 462 has a length 407. The upper portion 461 has an optical feature 467 disposed along its top side 434 and projecting downward toward (or in some cases extending beyond) the lower portion 462. The optical feature 467 can have any one or more of a number of shapes (e.g., conical, convex, concave, linear) that can be uniform, discrete, random, or otherwise disposed about an axis along the length 408 of the upper portion 461. The purpose of the optical feature 467 is to distribute the light generated by the one or more light sources 271 in a particular light profile from the indicator light 301. For example, the optical feature 467 can be shaped and positioned within the upper portion 461 so as to distribute the light emitted from the indicator light 301 substantially evenly in all directions. The optical feature 467 can have reflective and/or refractive properties, can be coated with a reflective material (e.g., aluminum), and/or can be made from the same or different materials compared to the rest of the light guide 260.

The outer sides 466 of the upper portion 461 can form some angle (e.g., approximately 90° as shown in FIG. 4, 120°, 75°) relative to the top side 434. If the angle between the outer sides 466 and the top side 434 is approximately 90°, the upper portion 461 is cylindrical in shape. Otherwise, the upper portion 461 is tapered inward (when the angle between the outer sides 466 and the top side 434 is greater than 90°), or outward (when the angle between the outer sides 466 and the top side 434 is less than 90°).

Similarly, the outer sides 464 of the lower portion 462 can form some angle (e.g., approximately 90°, 120°, 75°) relative to the top side 465. If the angle between the outer sides 464 and the top side 465 is approximately 90°, the lower portion 462 is cylindrical in shape. Otherwise, the lower portion 462 is tapered inward (when the angle between the outer sides 464 and the top side 465 is greater than 90°), or outward (when the angle between the outer sides 464 and the top side 465 is less than 90°, as shown in FIG. 4). FIGS. 6A and 6B below show an example of a light guide having an outward taper.

The outer sides 464 of the lower portion 462 form a cavity 469 that traverses some or all of the length 407 of the lower portion 462. If there is an upper portion 461, the cavity 469 can extend into the upper portion 461, if at all, to the point where the optical feature 467 extends into the upper portion 461. In some cases, the cavity 469 only extends into a part of the lower portion 462 and is bounded by a wall 439. In such a case, the wall 439 that forms the cavity 469 can be substantially the same shape and size of a portion of the light engine assembly 270 that is disposed within the cavity 469. In this example, the wall 439 forms a cavity 469 that has the same shape and size as the shape and size of the light source 271 of the light engine assembly 270. In certain example embodiments, the light guide 260 is solid, configured for the desired optical effect, aside from the cavity 469 and the optical feature 467.

In certain example embodiments, the surface of the outer sides 464 (also called the outer surface 464) of the lower portion 462 of the light guide 260 can be made of and/or coated with a reflective material (e.g., aluminum). In such a case, the light generated by the light source 271, disposed at the bottom end 463 of the lower portion 462 of the light guide 260, can be retained within the lower portion 462 of the light guide 260 as the light travels from the bottom end 463 to the top end 465 of the lower portion 462.

The outer sides 464 of the lower portion 462 and/or the outer sides 466 of the upper portion 461 can have one or more of a number of features along some or all of their length. Examples of such features can include, but are not limited to, a smooth surface, a textured surface, threading, notches, slots, detents, and a sawtooth surface. In this example, the outer sides 464 of the lower portion 462 have features that complement the inner surface 286 of the upper portion 281 of the housing 280 so that a proper flame path 259 can be created. For example, the outer sides 464 of the lower portion 462 of the light guide 260 and the inner surface 286 of the upper portion 281 of the housing 280 can be smooth and flat so that the outer sides 464 and the inner surface 286 abut against each other along their lengths. As another example, the outer sides 464 of the lower portion 462 of the light guide 260 and the inner surface 286 of the upper portion 281 of the housing 280 can have spiral shapes (e.g., mating threads) so that the outer sides 464 and the inner surface 286 abut against each other along their lengths. An example of another configuration of the light guide is shown below with respect to FIGS. 6A-7.

Figure 5:
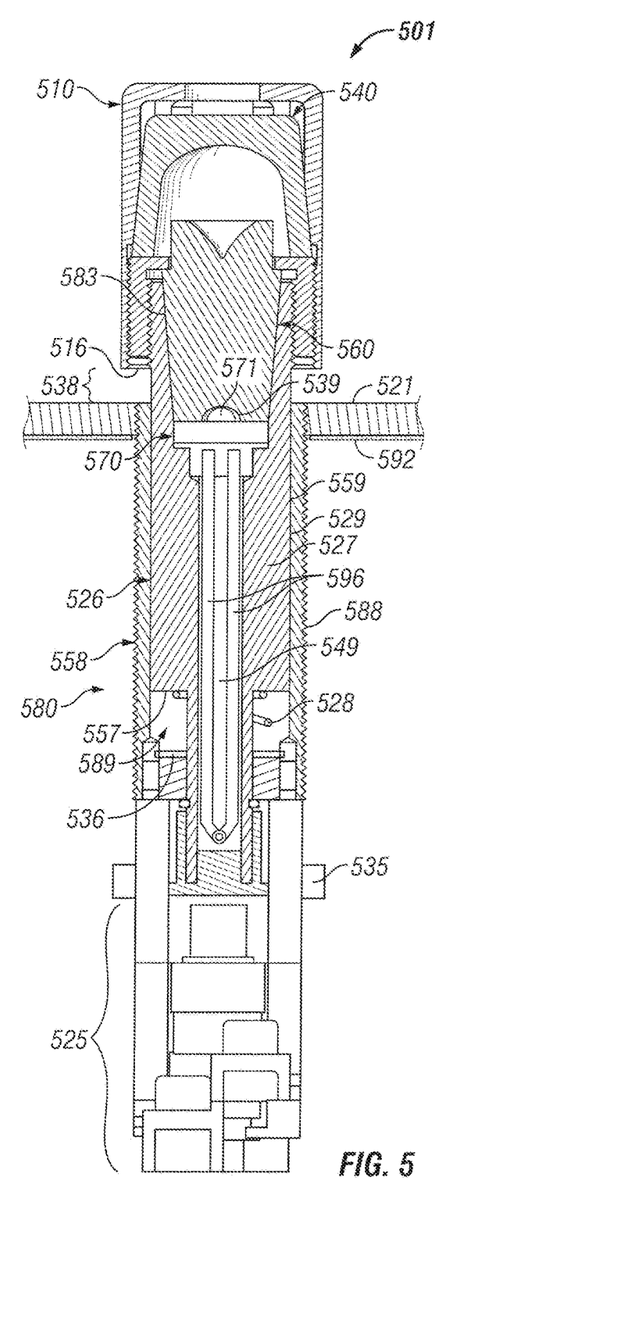
FIG. 5 shows a combination indicator light/pushbutton using a light guide in accordance with certain example embodiments.

FIG. 5 shows a combination indicator light/pushbutton 501 (or, more simply called an indicator light 501) using a light guide 560 in accordance with certain example embodiments. In one or more embodiments, one or more of the components shown in FIG. 5 may be omitted, added, repeated, and/or substituted. Accordingly, embodiments of combination indicator light/pushbuttons should not be considered limited to the specific arrangements of components shown in FIG. 5.

The indicator light 501 of FIG. 5 is substantially similar to indicator light 201 of FIGS. 2A-2C and indicator light 301 of FIGS. 3A and 3B, except as described below. Any component described in FIG. 5 can apply to a corresponding component having a similar label in FIGS. 2A-3B. In other words, the description for any component of FIG. 5 can be considered substantially the same as the corresponding component described with respect to FIGS. 2A-3B. Further, if a component of FIG. 5 is described but not expressly shown or labeled in FIG. 5, a corresponding component shown and/or labeled in FIG. 5 can be inferred from the corresponding component of FIGS. 2A-3B. Conversely, if a component in FIG. 5 is labeled but not described, the description for such component can be substantially the same as the description for the corresponding component with respect to FIGS. 2A-3B. The numbering scheme for the components in FIG. 5 herein parallels the numbering scheme for the components of FIGS. 2A-3B in that each component is a three digit number having the identical last two digits.

Referring to FIGS. 1A-5, the housing 580 can include an inner housing 526 and an outer housing 558. The inner housing 526 is movably (e.g., slidably) disposed within a cavity 589 of the outer housing 558. In this case, the flame path 559 is located between the outer surface 529 of the wall 527 of the inner housing 526 and the inner surface 585 of the wall 584 of the outer housing 558. Thus, the tolerance between the outer surface 529 of the wall 527 of the inner housing 526 and the inner surface 585 of the wall 584 of the outer housing 558 must be specifically engineered to allow for movement of the inner housing 526 within the outer housing 558 while still complying with applicable standards for explosion-proof and/or flame-proof enclosures. In addition, there can be a flame path 583 between the inner housing 526 and the light guide 560, similar to flame path 259 between the light guide 260 and the upper portion 281 of the housing 280 described above with respect to FIG. 2B.

In certain example embodiments, the outer housing 558 has coupling features (e.g., mating threads) disposed on its outer surface 588, which allows the outer housing 558 to become mechanically coupled to a wall 521 of an enclosure cover, a top end 592 of a mounting frame, and/or some other component of an electrical system. The outer housing 558 can also include one or more stops 536 disposed within the cavity 589 toward the bottom end of the outer housing 558. These one or more stops 536 can be protrusions that extend inward from the inner surface 585 of the wall 584 of the outer housing 558 and help prevent the inner housing 526 from traversing beyond a certain point relative to the outer housing 558.

The inner housing 526 can have a stopping feature 557 that abuts against, or proximate to, the one or more stops 536 when the inner housing 526 (as a result of the guard 510 being depressed downward by a user that is utilizing the pushbutton capability of the indicator light 501) is moved downward relative to the outer housing 558, which remains stationary when the pushbutton capability of the indicator light 501 is utilized.

In certain example embodiments, the inner housing 526 can also include an actuator 535 that is disposed, at least in part, at the distal end of the inner housing 526. and extends from the light engine assembly 570 and/or the bottom of the light guide 560 beyond the bottom end of the wall 527 of the inner housing 526. The actuator 535 can be rigid or semirigid. When the inner housing 526 moves toward its limit (e.g., as the stopping feature 557 of the inner housing 526 approaches the one or more stops 536 of the outer housing 558, as the lower end 516 of the guard 510 approaches the wall 521 of the enclosure), the distal end of the actuator 535 makes contact with a portion of the switch 525. In such a case, the portion of the switch 525 contacted by the distal end of the actuator 535 toggles the switch 525 from one state (e.g., open, slow, off) to another state (e.g., closed, fast, on).

The actuator 535 can also include a shell 549 that is used to house any electrical conductors 596 used to couple the light engine assembly 570 with the control module (not shown) and to protect the electrical conductor 596 from damage that may occur during the actuation of the pushbutton functionality of the indicator light 501. When the switch 525 is toggled by the actuator 535 of the indicator light 501, the light generated by the light source 571 and emitted by the indicator light 501 can be modified (e.g., change color, change brightness, change flash/constant state, turn on, turn off) in some way to signify the change in state of the equipment that is controlled by the switch 525. In the current art, a potting compound fills the shell 549 to protect the electrical conductors 596 and to suppress any flame that could propagate through the shell 549. However, because example embodiments are engineered with one or more flame paths (e.g., flame path 583, flame path 559) that comply with applicable standards, example embodiments do not have any potting compound, whether in the shell 549 or elsewhere within the indicator light 501.

In certain example embodiments, the indicator light 501 has a normal state (also, for example, a default state or a first state) and a depressed state (also, for example, a second state). When the indicator light 501 is not in the depressed state, it is in the normal state. For this to occur, a resilient device 528 can be used to keep the indicator light 501 in the normal state unless a force applied by a user to the guard 510 or some other top portion of the indicator light 501 is sufficient to overcome the opposing force applied by the resilient device 528 to the indicator light 501, which moves the indicator light into the depressed state. When the force applied by the user is no longer applied to the indicator light 501, the resilient device 528 moves the indicator light 501 from the depressed position to the normal position.

The resilient device 528 can be any device capable of a number (e.g., hundreds, thousands) of operations over a period of time (e.g., years, decades). Examples of a resilient device 528 can include, but are not limited to, a compression spring (as shown in FIG. 5), a tension spring, and an elastomeric material. The resilient device 528 can be positioned within the cavity 589 or other suitable location within or proximate to the indicator light 501 to return the indicator light 501 to a normal state absent a force applied by a user. In this case, the resilient device 528 is positioned between the stopping feature 557 of the inner housing 526 and the one or more stops 536 disposed within the cavity 589 toward the bottom end of the outer housing 558.

In certain example embodiments, the switch 525 is coupled to, or is a part of, the outer housing 558. In such a case, the switch 525, along with the outer housing 558, remains stationary relative to the inner housing 526 when the user applies a force to move the inner housing 526 and put the indicator light 501 in a depressed state. In other embodiments, the switch 525 can be a separate component from the indicator light 501 but is operatively coupled to the indicator light 501 so that the switch is toggled when the indicator light 501 moves from the normal state to the depressed state.

FIGS. 6A and 6B show another indicator light 601 in accordance with certain example embodiments. In one or more embodiments, one or more of the components shown in FIGS. 6A and 6B may be omitted, added, repeated, and/or substituted. Accordingly, embodiments of combination indicator light/pushbuttons should not be considered limited to the specific arrangements of components shown in FIGS. 6A and 6B.

The indicator light 601 (including its various components) of FIGS. 6A and 6B is substantially similar to indicator lights (including its corresponding components) described above with respect to FIGS. 2A-5, except as described below. Any component described in FIGS. 6A and 6B can apply to a corresponding component having a similar label in FIGS. 2A-5. In other words, the description for any component of FIGS. 6A and 6B can be considered substantially the same as the corresponding component described with respect to FIGS. 2A-5. Further, if a component of FIGS. 6A and 6B is described but not expressly shown or labeled in FIGS. 6A and 6B, a corresponding component shown and/or labeled in FIGS. 6A and 6B can be inferred from the corresponding component of FIGS. 2A-5. Conversely, if a component in FIGS. 6A and 6B is labeled but not described, the description for such component can be substantially the same as the description for the corresponding component with respect to FIGS. 2A-5. The numbering scheme for the components in FIGS. 6A and 6B herein parallels the numbering scheme for the components of FIGS. 2A-5 in that each component is a three digit number having the identical last two digits.

Referring to FIGS. 1A-6B, the optional adapter 651 of FIGS. 6A and 6B is now located at the bottom end of the indicator light 601, abutting against the light engine assembly 670 in this case. In other words, the adapter 651 is not positioned between or adjacent to the guard 610 and/or the light guide 660, as with the indicator light 501 of FIG. 5. The inner surface 654 and the outer surface 655 of the adapter 651 can be smooth, textured, or have one or more coupling features (e.g., mating threads) disposed thereon. The cavity 656 of the adapter 651 can allow one or more electrical conductors to pass therethrough to provide power and/or control to the light engine assembly 670.

Further, the guard 610 of FIGS. 6A and 6B does not have any side windows 214 that are formed by the top wall 215, as with the guard 210 described above. Instead, the guard 610 has top window 611 that traverses most of the top, where the top window 611 is formed by a top border 615. The top border 615 also serves to abut against an extension 645 of the lens 640, allowing the guard 610 to secure the lens 640.

As discussed above, the light guide 660 of FIGS. 6A and 6B is tapered inward because the angle 668 formed between the outer sides 664 and the top side 634 is greater than 90°. Also, the light guide 660 in this case only has one portion rather than multiple portions, such as the light guide 260 above having two portions. In such a case, the outer sides 664 can be tapered over some or all the height 606 of the light guide 660. Further, the cavity 669 formed by the wall 639 is shaped not only for the light source 671, but also some of the circuit board 672, of the light engine assembly 670.

FIG. 7 shows another indicator light assembly 750 that includes the indicator light 601 of FIGS. 6A and 6B in accordance with certain example embodiments. In addition to the components of the indicator light 601 being the same as described above with respect to FIGS. 6A and 6B, the rest of the indicator light assembly 750 is substantially the same as the corresponding components of the indicator light assembly 150 described above with respect to FIGS. 2A-2C.

The systems and methods described herein allow an indicator light to be used in hazardous environments and potentially explosive environments. Specifically, example embodiments allow indicator lights and any electrical enclosures to which an example indicator light is coupled to comply with one or more standards that apply to electrical devices and enclosures located in such environments. Example embodiments also allow for reduced manufacturing time, materials (e.g., no potting compound), and costs of indicator lights. Example embodiments also provide for increased reliability of indicator lights. Example embodiments can also combine the benefits of an indicator light with a pushbutton, while still meeting any applicable standards for explosion-proof, flame-proof, or other hazardous locations.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An indicator light, comprising:
a housing comprising at least one wall, wherein the at least one wall forms a cavity, and wherein the housing has a first length;
a light guide disposed within the cavity of the housing and abutting against the housing toward a distal end of the housing, wherein the light guide has a second length that is less than the first length;
a mechanical retention feature coupled to the housing, wherein the mechanical retention feature secures the light guide within the cavity of the housing; and
a light source disposed adjacent to the light guide,
wherein the housing and the light guide form a circumferential flame path therebetween.

2. The indicator light of claim 1, wherein the light guide comprises at least a first portion, wherein the first portion is tapered.

3. The indicator light of claim 2, wherein the light guide further comprises a second portion, wherein the second portion is cylindrical.

4. The indicator light of claim 3, wherein the light source is disposed within the first portion of the light guide.

5. The indicator light of claim 1, wherein the mechanical retention feature comprises:
a guard coupled to the housing and disposed over the distal end of the housing and the light guide.

6. The indicator light of claim 5, wherein the mechanical retention feature further comprises
an adapter disposed over the light guide, wherein the adapter is further disposed within the guard at the proximal end of the guard.

7. The indicator light of claim 6, further comprising:
a lens disposed adjacent to the adapter and within the guard.

8. The indicator light of claim 1, wherein the light source comprises at least one light-emitting diode (LED).

9. The indicator light of claim 8, wherein the at least one LED emits at least two colors, wherein the at least one LED has a light output that is controlled by a control module.

10. The indicator light of claim 9, wherein the control module comprises at least one electrical conductor, wherein the at least one electrical conductor is coupled to the light source.

11. The indicator light of claim 1, wherein the light guide has a reflective material disposed on its outer surface.

12. The indicator light of claim 1, wherein the housing is void of potting compound.

13. The indicator light of claim 1, wherein the housing comprises at least one coupling feature disposed on an outer surface of the housing, wherein the at least one coupling feature is configured to couple to an electrical enclosure when the housing is disposed within an aperture that traverses a wall of the electrical enclosure.

14. An indicator light assembly, comprising:
a mounting frame; and
an indicator light coupled to the mounting frame, wherein the indicator light comprises:
a housing comprising at least one wall, wherein the at least one wall forms a cavity, and wherein the housing has a first length;
a light guide disposed within the cavity of the housing and abutting against the housing toward a distal end of the housing, wherein the light guide has a second length that is less than the first length;
a mechanical retention feature coupled to the housing, wherein the mechanical retention feature secures the light guide within the cavity of the housing; and
a light source disposed adjacent to the light guide,
wherein the housing and the light guide form a circumferential flame path therebetween.

15. The indicator light assembly of claim 14, further comprising:
a control module mechanically coupled to the mounting frame and operatively coupled to the light source of the indicator light, wherein the control module controls an operation mode of the light source.

16. The indicator light assembly of claim 14, wherein the mounting frame is configured to mechanically couple to an interior of an electrical enclosure.

17. The indicator light assembly of claim 14, wherein the housing comprises at least one coupling feature disposed on an outer surface of the housing, wherein the at least one coupling feature is configured to couple to the electrical enclosure when the housing is disposed within an aperture that traverses a wall of the electrical enclosure.

18. An indicator light, comprising:
an outer housing comprising at least one outer housing wall, wherein the at least one outer housing wall forms a first cavity, and wherein the outer housing has a first length;
an inner housing movably disposed within the first cavity of the outer housing, wherein the inner housing comprises at least one inner housing wall, wherein the at least one inner housing wall forms a second cavity;
a light guide disposed within the second cavity of the inner housing at a distal end of the inner housing, wherein the light guide has a second length that is less than the first length, and wherein the light guide and the inner housing are movable between a first position and a second position within the outer housing;
a light source disposed adjacent to the light guide; and a switch disposed in the first cavity and adjacent to a proximal end of the inner housing, wherein the switch toggles between at first state and a second state, wherein the inner housing and the outer housing form a flame path therebetween.

19. The indicator light of claim 18, wherein the inner housing toggles the switch when the inner housing is moved to the second position within the outer housing.

20. An indicator light assembly, comprising:
a mounting frame;
an indicator light coupled to the mounting frame, wherein the indicator light comprises:
 a housing;
 a light guide that is disposed within and abuts against the housing;
 a mechanical retention feature coupled to the housing, wherein the mechanical retention feature secures the light guide within the cavity of the housing; and
 a light source disposed adjacent to the light guide; and
a control module mechanically coupled to the mounting frame and operatively coupled to the light source of the indicator light,
wherein the control module controls an operation mode of the light source,
wherein the housing and the light guide form a circumferential flame path therebetween, and
wherein the housing of the indicator light is configured to be coupled to an electrical enclosure.

* * * * *

UNITED STATES PATENT AND TRADEMARK OFFICE
CERTIFICATE OF CORRECTION

PATENT NO.         : 9,946,013 B2
APPLICATION NO.    : 14/490140
DATED              : April 17, 2018
INVENTOR(S)        : Yi Yang et al.

Page 1 of 1

It is certified that error appears in the above-identified patent and that said Letters Patent is hereby corrected as shown below:

In the Claims

Claim 18, Column 19, Line 3: After the word "between", delete the word "at" and replace it with the word "a"

Signed and Sealed this
Twelfth Day of June, 2018

Andrei Iancu
*Director of the United States Patent and Trademark Office*